3,340,163
METHOD FOR FORMING A TETRAGONAL CRYSTALLINE OXIDE COATING ON GERMANIUM
Stanley Edwin Bradshaw, Harrow, and John George Wilkes, Hatch End, England, assignors to The General Electric Company Limited, London, England
No Drawing. Filed Aug. 6, 1963, Ser. No. 300,157
Claims priority, application Great Britain, Aug. 9, 1962, 30,660/62
8 Claims. (Cl. 204—35)

In the manufacture of semiconductor devices incorporating silicon bodies, use is commonly made of coatings of silica formed on such bodies. Such a coating may for example be formed on part of the surface of a silicon body into which an impurity is to be diffused, the coating serving as a mask which inhibits or slows down diffusion of the impurity through the coated part of the surface. Alternatively, such a coating may be formed on a silicon body forming part of a completed semiconductor device, to protect the surface of the body from the effects of the ambient atmosphere.

Analogous techniques have not hitherto been available in the manufacture of semiconductor devices incorporating germanium bodies, since the methods previously available for forming coatings of germanium dioxide on such bodies result in the oxide having a structure such that its properties make it generally unsuitable for use for purposes similar to those for which coatings of silica on silicon bodies are used; in particular, the oxide is readily soluble in water, hydrofluoric acid or a dilute solution of sodium hydroxide.

We have now found that it is possible to form on a germanium body a coating of germanium dioxide having a tetragonal crystal structure, the oxide in this case being virtually insoluble in water or hydrofluoric acid and being only slowly soluble in a hot 50% solution of sodium hydroxide; such a coating may suitably be used for purposes akin to those for which coatings of silica on silicon bodies are used.

Thus, according to one aspect of the invention there is provided a germanium body having formed on its surface coherent adherent layer of germanium dioxide having a tetragonal crystal structure.

According to another aspect of the invention there is provided a method of preparing such a body in which a germanium body, initially having on its surface a layer of germanium dioxide in a water-soluble form, is heated above 120° C. in a liquid medium in a sealed vessel, the natures of the medium and the heat cycle being such that the original oxide layer is replaced by a layer of germanium dioxide having a tetragonal crystal structure. The initial oxide layer may for example be formed by an electrolytic or thermal oxidation process.

One class of liquid media which may suitably be used in such a method consists of liquids in which the germanium dioxide in its initial form is soluble to a very limited extent such that only part of the initial dioxide layer is dissolved into the medium at the beginning of the heat cycle. Examples of such media are certain alcohols, in particular methanol, ethanol, ethylene glycol and glycerol. Where such a medium is used it may be found that the duration of the heat cycle necessary to complete the formation of the desired oxide layer can be reduced by including in solution in the medium a small quantity of a compound, such as tartaric acid, which forms a stable complex with germanium dioxide. It should be noted that a liquid, such as water, in which the germanium dioxide in its initial form is readily soluble is not suitable for use in a method as specified above; attempts to use such a liquid result in complete stripping of the initial oxide layer from the surface of the germanium and although some redeposition of the oxide in a tetragonal form may occur this will not normally take place to a worthwhile extent on the germanium body.

One method of performing the invention will low be described by way of example.

In this method a germanium body, which has been lapped and then etched to remove surface damage, firstly has a coherent layer of germanium dioxide formed on its surface by an electrolytic oxidation process, the germanium body being connected as an anode in an electrolytic cell having a platinum cathode and an electrolyte consisting of a solution of sodium acetate in glacial acetic acid. Where the oxide layer is to have a thickness up to about 1,000 A., the concentration of the sodium acetate may suitably be 0.25 N and the current density about 100 microamperes per square centimetre of free surface area of the germanium, but where thicker oxide layers are required it is preferred to use a sodium acetate concentration of 0.1 N and a current density of about two milliamperes per square centimetre; in either case the duration of the oxidation process may suitably be from one to five hours, the thickness of the resultant oxide layer increasing with an increase of the duration of the process within this range.

The resultant oxide layer is of very uniform thickness, and is readily soluble in water, being partly amorphous and partly crystalline with the hexagonal crystal structure normally found for germanium dioxide.

After formation of the initial oxide layer, the germanium body is disposed in a sealed vessel in which it is immersed in a liquid medium selected from the class indicated above, the liquid occupying about three quarters of the available space in the vessel. The vessel and its contents are then maintained at a temperature of 200° C. for a time sufficient for the initial oxide layer to be replaced on the surface of the germanium body by a coherent layer of germanium dioxide having a tetragonal crystal structure; the process occurring during the heating is thought to involve a gradual erosion of the initial oxide layer by the liquid medium accompanied by a continuous redeposition from the medium of the oxide in the tetragonal form. Suitable times for the heating with certain of the appropriate media are 24 hours with pure ethylene glycol, 60 hours with pure methanol, and 24 hours with methanol containing tartaric acid at a concentration of 1% w./v.

The final oxide layer is considerably thinner than the initial oxide layer, and is found to be firmly adherent to the germanium body. X-ray analysis of the tetragonal form of germanium dioxide produced by the specific method described above indicates that the crystal lattice unit cell dimensions differ slightly from those of the tetragonal form of the oxide which may be produced by processes involving the use of flux melting at higher temperatures, for example as reported by Laubengayer and Morton in Journal of the Americal Chemical Society, vol. 54, p. 2203. The relevant dimensions are given in Table I below, in which the column headed T(I) relates to the known tetragonal form of the oxide and the column headed T(II) relates to the form produced by the method described above.

TABLE I

|  | T(I) | T(II) |
|---|---|---|
| a | 4.396 A. | 4.417 A. |
| c | 2.862 A. | 2.853 A. |
| c/a | 0.651 | 0.646 |

It will be appreciated that a method as described above is particularly suitable for use in the course of the manufacture of semiconductor devices incorporating germanium bodies, since it does not involve the subjection of the germanium bodies to excessively high temperatures which might have an undesirable effect on the properties of the resultant devices.

We claim:

1. A method of preparing a germanium body which has on its surface a coherent adherent layer of germanium dioxide having a tetragonal crystal structure, which method includes the steps of immersing a germanium body, initially having on its surface a layer of germanium dioxide in a water-soluble form, in a liquid alcohol in which the said water-soluble form of germanium dioxide is soluble to a limited extent such that only part of the initial oxide layer is dissolved into the alcohol at the commencement of heating, and heating the said body, while so immersed, in a sealed vessel to a temperature above 120° C., for a period of time, being at least 24 hours, such that the initial oxide surface layer is replaced by a layer of germanium dioxide having a tetragonal crystal structure.

2. A method according to claim 1 wherein the initial surface layer of germanium dioxide in water-soluble form is formed on the germanium body by an electrolytic oxidation process which comprises connecting the germanium body as an anode in an electrolytic cell having a platinum cathode, immersing the germanium body and the cathode in an electrolyte consisting of glacial acetic acid containing in solution sodium acetate in a concentration in the range of 0.1 N to 0.25 N, and passing through the cell an electric current such that the current density is in the range of 100 microamperes to 2 milliamperes per square centimetre of free surface area of the germanium, for a period of from one to five hours.

3. A method according to claim 1, wherein the said germanium body, having an initial surface layer of germanium dioxide in water-soluble form, is immersed in liquid ethylene glycol and, while so immersed, is heated at 200° C. for 24 hours.

4. A method according to claim 1, wherein the said germanium body, having an initial surface layer of germanium dioxide in water-soluble form, is immersed in liquid methyl alcohol and, while so immersed, is heated at 200° C. for 60 hours.

5. A method according to claim 1, wherein the said germanium body, having an initial surface layer of germanium dioxide in water-soluble form, is immersed in liquid methyl alcohol containing in solution tartaric acid at a concentration of 1% weight/volume and, while so immersed, is heated at 200° C. for 24 hours.

6. A method according to claim 1, in which the said alcohol is selected from the group consisting of methanol, ethanol, ethylene glycol and glycerol.

7. A method according to claim 1, in which the alcohol includes in solution a small quantity of a compound which forms a stable complex with germanium dioxide.

8. A method according to claim 7, in which said compound is tartaric acid.

References Cited

FOREIGN PATENTS 1,331,756  5/1963  France.
646,528  10/1962  Italy.

ALFRED L. LEAVITT, *Primary Examiner.*

WILLIAM L. JARVIS, *Examiner.*